US012281755B2

(12) United States Patent
Kumagai et al.

(10) Patent No.: US 12,281,755 B2

(45) Date of Patent: Apr. 22, 2025

(54) GAS CONTAINER

(71) Applicant: TOYODA GOSEI CO., LTD., Kiyosu (JP)

(72) Inventors: Takuhiro Kumagai, Kiyosu (JP); Kentaro Enomoto, Kiyosu (JP); Masahide Kobayashi, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 49 days.

(21) Appl. No.: 18/185,568

(22) Filed: Mar. 17, 2023

(65) Prior Publication Data

US 2023/0296208 A1 Sep. 21, 2023

(30) Foreign Application Priority Data

Mar. 18, 2022 (JP) ................................ 2022-044454
Mar. 18, 2022 (JP) ................................ 2022-044472
Mar. 18, 2022 (JP) ................................ 2022-044481

(51) Int. Cl.
*F17C 11/00* (2006.01)
*F17C 13/06* (2006.01)

(52) U.S. Cl.
CPC .............. *F17C 11/00* (2013.01); *F17C 13/06* (2013.01); *F17C 2201/0114* (2013.01); *F17C 2203/012* (2013.01); *F17C 2203/066* (2013.01)

(58) Field of Classification Search
CPC ....... F17C 11/00; F17C 11/005; F17C 11/007; F17C 2203/012
See application file for complete search history.

(56) References Cited

U.S. PATENT DOCUMENTS 4,134,491 A * 1/1979 Turillon ................ F17C 11/005 220/88.1
2005/0000970 A1* 1/2005 Kimbara ............... F17C 11/005 220/581

(Continued)

FOREIGN PATENT DOCUMENTS

JP 2004-316673 A 11/2004
JP 2006-177536 A 7/2006

(Continued)

OTHER PUBLICATIONS

Office Action dated Jan. 28, 2025 issued for the corresponding Japanese Patent Application No. 2022-044454 (and English translation).

(Continued)

*Primary Examiner* — Don M Anderson
(74) *Attorney, Agent, or Firm* — Posz Law Group, PLC

(57) ABSTRACT

A gas container includes: a tubular container body having an internal space for storing gas; a connector attached to an end portion of the container body in a shaft direction and having a communication passage for allowing the internal space to communicate with an outside of the container body; and a storage member disposed in the internal space to absorb and release gas. The storage member has one of a recess portion and a projection portion which are provided on a radial outer surface thereof and engage with each other. The container body has the other of the recess portion and the projection portion which are provided on a radial inner surface thereof.

5 Claims, 8 Drawing Sheets

(56) References Cited

U.S. PATENT DOCUMENTS

| | | | | |
|---|---|---|---|---|
| 2013/0209353 A1* | 8/2013 | Hirano | F17C 11/005 | 423/648.1 |
| 2014/0363346 A1* | 12/2014 | Pigeon | F01N 3/08 | 422/173 |
| 2016/0201853 A1* | 7/2016 | Weickert | F17C 11/007 | 220/86.1 |
| 2016/0356198 A1* | 12/2016 | Dementhon | F17C 11/00 | |
| 2019/0150427 A1* | 5/2019 | McCormick | A01N 1/0257 | |
| 2020/0333085 A1* | 10/2020 | Nam | F17C 11/005 | |
| 2023/0296208 A1* | 9/2023 | Kumagai | F17C 11/00 | 206/0.7 |

FOREIGN PATENT DOCUMENTS

| | | |
|---|---|---|
| JP | 2006-207719 A | 8/2006 |
| JP | 2007-333158 A | 12/2007 |
| JP | 2009-222200 A | 10/2009 |

OTHER PUBLICATIONS

Office Action dated Febr. 12, 2025 issued for the corresponding Japanese Patent Application No. 2022-044472 (and English translation).

Office Action dated Feb. 12, 2025 issued for the corresponding Japanese Patent Application No. 2022-044481 (and English translation).

* cited by examiner

GAS CONTAINER

CROSS-REFERENCE TO RELATED APPLICATION(S)

This application is based upon and claims the benefit of priority from prior Japanese patent applications No. 2022-044454, No. 2022-044472 and No. 2022-044481 filed on Mar. 18, 2022, the entire contents of which are incorporated herein by reference.

BACKGROUND

1. Field of the Invention

The present disclosure relates to a gas container capable of absorbing and releasing gas.

2. Description of the Related Art

A gas container (for example, JP-A-2009-222200 and JP-A-2006-177536) that is mounted on a vehicle or the like to store and release gas such as hydrogen gas or natural gas is known. The gas container described in JP-A-2009-222200 or JP-A-2006-177536 has a storage member such as a hydrogen absorbing alloy. The storage member physically or chemically absorbs and releases the gas to be stored. The storage member is accommodated and held in an accommodation member disposed in the internal space of the tubular container body. According to such storage member, the amount of gas that can be stored in the internal space of the container body can be increased.

Incidentally, as a structure for accommodating the storage member in the internal space of the gas container, as described in JP-A-2009-222200, there is a case where an accommodation member arranged in the internal space is used. The accommodation member is formed, for example, in a tubular shape extending in the shaft direction, and is formed in a shape in which a plurality of accommodation spaces partitioned by partition walls are regularly arranged. The accommodation member is fixed to the end portion or the like of the container body in the shaft direction via a coupling unit or the like at the end portion in the shaft direction. The storage member extends in the shaft direction following the shape of each accommodation space of the accommodation member and is accommodated in each accommodation space. According to such structure, the storage member can be accommodated and held in each accommodation space of the accommodation member arranged in the internal space of the container body.

However, in the gas container described in JP-A-2009-222200, to accommodate the storage member in the internal space of the container body, it is necessary to accommodate the accommodation member for holding the storage member in the internal space. Therefore, the structure inside the gas container becomes complicated, and the volume of the storage member is reduced by the volume of the accommodation member in the internal space, and thus the amount of gas that can be stored in the internal space is reduced.

On the other hand, when the storage member is directly accommodated in the internal space of the container body, the volume of the storage member increases, and thus the amount of gas that can be stored in the internal space can be increased. However, in such structure, assuming that the storage member can move freely with respect to the container body in the space in the shaft direction or the rotational direction around the shaft, for example, if a storage member is formed by hardening powder, there is a concern that breakage will occur due to rubbing or the like between the storage member and the inner surface of the container body, and powderization will be accelerated.

Further, the storage member generates heat when absorbing gas and absorbs heat when releasing gas. The temperature change of the storage member is related to the gas storing performance. Therefore, when temperature deviation occurs in the entire storage member, the performance of the storage member cannot be maximized. Therefore, in the gas container described in JP-A-2006-177536, to control the temperature of the storage member, a pipe for heat exchange with the storage member by flowing a heat exchange medium is provided. Incidentally, in the gas container described in JP-A-2006-177536, the accommodation member for accommodating the storage member is held on the inner surface of the container body via a support member in the internal space of the container body. However, particularly when the container body is made of resin, the container body may expand according to the amount of gas to be stored, and thus there is a concern that the holding of the accommodation member in the internal space of the container body becomes unstable. When the support member is interposed between the inner surface of the container body and the accommodation member, a structure needs to be adopted in which the support member is attached to the inner surface of the container body and to the accommodation member, and thus there is a concern that the structure inside the container body becomes complicated.

SUMMARY

The present disclosure provides a gas container capable of securing a sufficient amount of gas to be stored in the internal space of the container body and fix and hold the storage member.

Further, the present disclosure provides a gas container capable of controlling a temperature of a storage material and stably holding an accommodation member without complicating the structure inside the container body.

According to an aspect of the present disclosure, there is provided a gas container including: a tubular container body having an internal space for storing gas; a connector attached to an end portion of the container body in a shaft direction and having a communication passage for allowing the internal space to communicate with an outside of the container body; and a storage member disposed in the internal space to absorb and release gas, where: the storage member has one of a recess portion and a projection portion which are provided on a radial outer surface thereof and engage with each other; and the container body has the other of the recess portion and the projection portion which are provided on a radial inner surface thereof.

According to such configuration, it is possible to secure a sufficient amount of gas to be stored in the internal space of the container body and to fix and hold the storage member.

According to another aspect of the present disclosure, there is provided a gas container including: a tubular container body having an internal space; a connector attached to an end portion of the container body in a shaft direction and having a communication passage for allowing the internal space to communicate with an outside of the container body; and a storage material accommodated in the internal space to absorb and release gas, where the connector includes: an inlet through which a heat exchange medium flows; an outlet through which the heat exchange medium flows; and a passage portion having one end connected to the inlet and the other end connected to the outlet, through which the heat exchange medium flows.

According to such configuration, the accommodation member can control the temperature of the storage material without complicating the structure of the gas container.

According to still another aspect of the present disclosure, there is provided a gas container including: a tubular container body having an internal space for storing gas; a connector attached to an end portion of the container body in a shaft direction; a storage member that absorbs and releases gas; and a tubular accommodation member disposed in the internal space and having an accommodation space for accommodating the storage member, where the connector and the accommodation member have an uneven structure that fits together.

According to such configuration, the accommodation member can be stably held without complicating the structure inside the container body.

BRIEF DESCRIPTION OF THE DRAWINGS

The present disclosure will become more fully understood from the detailed description given hereinbelow and the accompanying drawing which is given by way of illustration only, and thus is not limitative of the present disclosure and wherein.

DETAILED DESCRIPTION OF THE INVENTION

First Embodiment

A first embodiment of a gas container according to the present disclosure will be described below with reference to FIGS. 1 to 5.

A gas container 1 according to an embodiment is a container that stores gas and releases the stored gas. The gas container 1 is mounted on a vehicle or the like that uses stored gas as fuel. The gas stored in the gas container 1 may be any type of gas, but is preferably a fuel gas such as hydrogen gas or natural gas. The pressure of the gas that can be stored in the gas container 1 may be any pressure, and may be a high pressure (for example, 100 MPa). That is, the gas container 1 may be a pressure container or a pressure resistant container.

Figure 1:
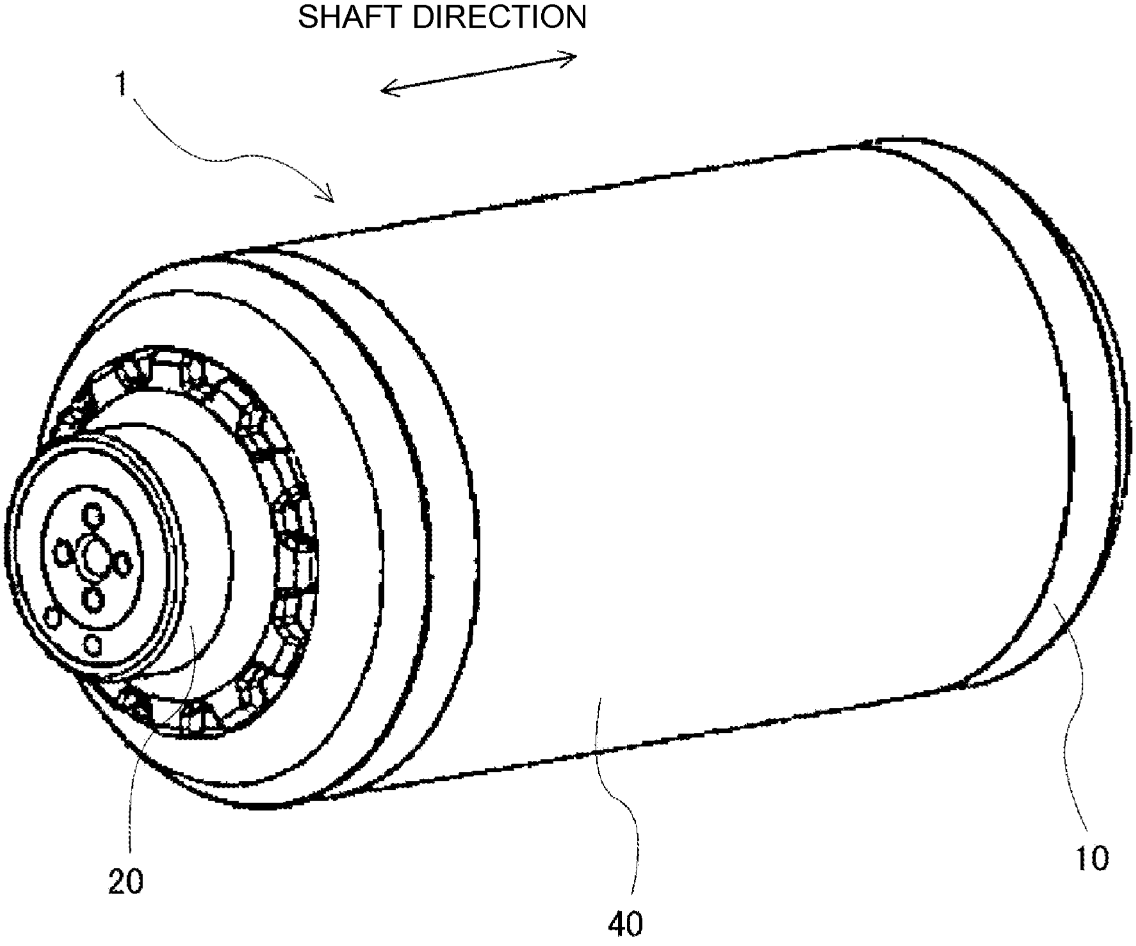
FIG. 1 is a perspective view of a gas container according to an embodiment of the present disclosure.

The gas container 1 includes a container body 10, connectors 20 and 30, a reinforcing member 40, and a storage member 60, as illustrated in FIG. 1.

The container body 10 is a liner for storing gas. The container body 10 has an internal space 11. The internal space 11 has a capacity capable of storing a predetermined amount of gas. The container body 10 is made of a material having a gas barrier property that does not or hardly permeates the gas stored in the internal space 11. The material of the container body 10 may be selected according to the usage environment or the like of the gas container 1.

For example, when the gas is hydrogen, the material of the container body 10 is polyethylene resin, polypropylene resin, or the like. The inside of the container body 10 may be coated with a material having excellent gas barrier properties, such as ethylene-vinyl alcohol high polymer (EVOH). When the gas container 1 is used for residential use, and the mass of the gas container 1 may be large, the material of the container body 10 may be a metal material such as aluminum or stainless steel. However, the container body 10 may be made of a material that is more easily deformed than the storage member 60 due to changes in the temperature or internal pressure of the internal space.

The container body 10 is formed in a tubular shape to enclose the internal space 11. The container body 10 is formed, for example, in a cylindrical shape or a regular polygonal cylindrical shape such that the gas pressure is uniformly distributed within the internal space 11. The container body 10 and the internal space 11 extend in the shaft direction. The container body 10 is formed such that the diameter of both end portions in the shaft direction is reduced from the center side in the shaft direction to the end sides in the shaft direction. The container body 10 is formed to bend from both ends in the shaft direction toward the internal space 11 in the shaft direction to form a recess. The internal space 11 is formed in a columnar shape along the inner surface of the container body 10.

The container body 10 has a straight portion 14 and dome portions 15 and 16. The straight portion 14 is a part that extends in the shaft direction at the center of the container body 10 in the shaft direction and is formed in a tubular shape (for example, a cylindrical shape). The dome portions 15 and 16 are parts formed in a dome shape (for example, a hemispherical shell shape) at both end portions of the container body 10 in the shaft direction. The container body 10 is arranged in a row in the order of the dome portion 15→the straight portion 14→the dome portion 16 from one end side in the shaft direction to the other end side in the shaft direction.

The container body 10 has opening portions 12 and 13. The opening portion 12 is a part that opens at one end of the container body 10 in the shaft direction. The opening portion 13 is a part that opens at the other end of the container body 10 in the shaft direction. The opening portions 12 and 13 are provided in dome portions 15 and 16 of the container body 10. The connector 20 is inserted into the opening portion 12. The connector 30 is inserted into the opening portion 13.

The connectors 20 and 30 are members that allow gas to flow between the internal space 11 of the container body 10 and the outside. That is, the connectors 20 and 30 are used for introducing gas from the outside of the container body 10 into the internal space 11 and releasing gas from the internal space 11 to the outside of the container body 10. The connectors 20 and 30 are attached to the end portions of the container body 10 in the shaft direction. A sealing member such as an O-ring is interposed between the connectors 20 and 30 and the container body 10 to prevent leakage of gas from the internal space 11 of the container body 10 to the outside. The connectors 20 and 30 are made of metal such as aluminum or stainless steel to secure rigidity.

The connectors 20 and 30 have communication passages 21 and 31, respectively. The communication passages 21 and 31 are passages that allow the internal space of the container body 10 to communicate with the outside. The communication passages 21 and 31 are connected to gas pipes and valves (not illustrated).

Figure 2:
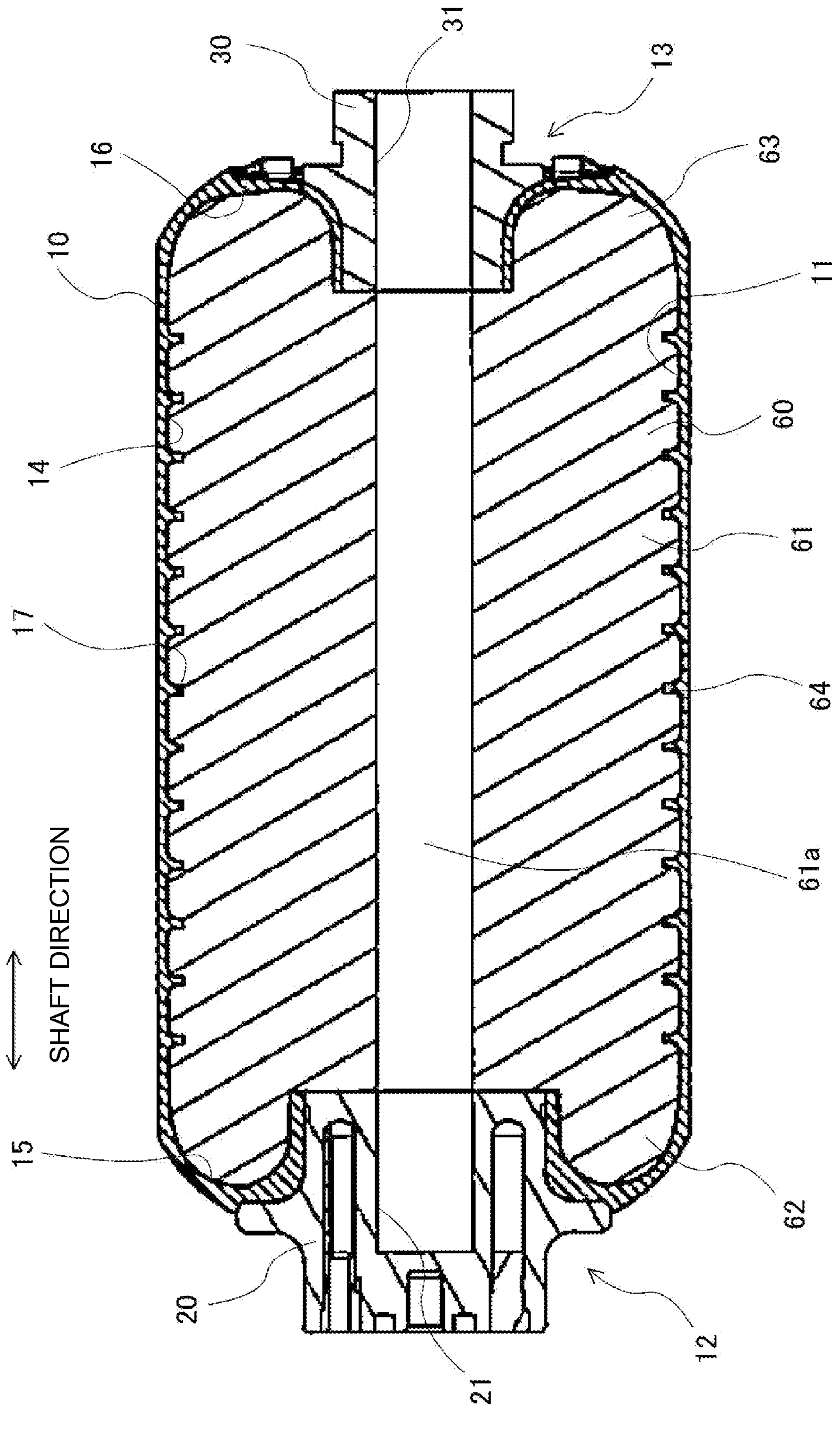
FIG. 2 is a sectional view of the gas container of a first embodiment.

The gas container 1 may allow gas to enter and exit through both the communication passages 21 and 31 of the connectors 20 and 30, or as illustrated in FIG. 2, gas may enter and exit only through one of the communication passages 21 and 31 (specifically, the communication passage 31), and a plug may be mounted on the other (specifically, the communication passage 21). The gas container 1 may have the connector 20 or the connector 30 attached to one of the end portions of the container body 10 in the shaft direction for allowing gas to enter and exit. The connectors 20 and 30 may function as heat exchangers in which a heat exchange medium circulates to adjust the temperature of the gas container 1.

The container body 10 is formed separately from the connectors 20 and 30, and is integrated with the connectors 20 and 30 by inserting the connectors 20 and 30 after formation. The container body 10 may be integrally formed with the connectors 20 and 30 by, for example, insert molding.

The reinforcing member 40 is a member that covers the radial outer surface of the container body 10 to reinforce the container body 10. The reinforcing member 40 is preferably used particularly when the gas container 1 is a pressure resistant container. The reinforcing member 40 is made of, for example, resin-impregnated high-strength fibers (that is, FRP). The high-strength fibers are carbon fibers, glass fibers, aramid fibers, and the like. The resin impregnated into the high-strength fiber is thermosetting resin such as epoxy resin, unsaturated polyester resin, or vinyl ester resin.

For example, the reinforcing member 40 may be formed as a helical layer or a hoop layer by winding high-strength fibers impregnated with resin around the outer surface of the container body 10, or may be formed as a sheet-shaped helical layer or hoop layer using resin and high-strength fibers adheres to the outer surface of the container body 10. The reinforcing member 40 may be formed by heating and curing resin after forming the helical layer and the hoop layer.

The storage member 60 is a member that absorbs and releases gas. The storage member 60 is accommodated in the internal space 11 of the container body 10 and held by the container body 10. The storage member 60 is formed in a columnar shape following the shape of the internal space 11. The storage member 60 extends in the shaft direction. A cross section obtained by cutting the storage member 60 along a surface orthogonal to the shaft direction corresponds to the cross section of the internal space 11. The storage member 60 is made of a material suitable for the type of gas to be stored. Materials of the storage member 60 are, for example, porous carbon materials such as carbon nanotubes, porous metal complexes (that is, MOFs), zeolites, hydrogen absorbing alloys, metal hydrides, and the like.

The storage member 60 may be formed while powders such as primary particles and secondary particles are solidified, that is, in the shape of pellets. According to the pellet-shaped storage member 60, a large contact area of the storage member 60 with respect to the gas can be secured, and thus the gas absorbing and releasing performance can be improved. Note that the volume of the storage member 60 is preferably close to 100% of the volume of the internal space 11 to secure the gas storage amount, but may be 90% or more. The storage member 60 is formed by cross-linking the storage member material powder with a cross-linking agent or binding the storage member material powder with a binder. The cross-linking agents and binders are made of, for example, silicon-based, epoxy-based, or amine-based materials.

Note that the storage member 60 may have properties that change according to the position in the shaft direction. For example, the storage member 60 may be configured to be more resistant to breakage at the end portion in the shaft direction than at the center in the shaft direction. The breakage resistance may be an indicator of the difficulty of powderization of the powdered storage member 60. The breakage resistance can be called strength, rigidity, wear resistance, viscosity, elastic force, and the like.

When the amount of the cross-linking agent or the like that crosslinks the material powder of the storage member 60 increases, the amount of the storage member 60 that can be accommodated in the accommodation space 52 is reduced by the same amount, the amount that the storage member 60 can store gas is reduced, and as a result, the absorbing and releasing performance of the storage member 60 deteriorates. Therefore, in the storage member 60, when the breakage resistance of the end portion in the shaft direction is higher than that of the center in the shaft direction, the absorbing and releasing performance of the end portion in the shaft direction deteriorates more than that of the center in the shaft direction.

The storage member 60 is formed along the inner surfaces of the straight portion 14 and the dome portions 15 and 16 of the container body 10. The storage member 60 is assembled and integrated with the container body 10 by insert molding. The storage member 60 has a straight corresponding unit 61 corresponding to the straight portion 14 and dome corresponding units 62 and 63 corresponding to the dome portions 15 and 16.

The straight corresponding unit 61 is a part formed in the columnar shape (for example, circular columnar shape) that extends in the shaft direction at the center of the storage member 60 in the shaft direction. The radial outer surface of the straight corresponding unit 61 faces the radial inner surface of the straight portion 14 of the container body 10 in the radial direction. As illustrated in FIG. 2, the straight corresponding unit 61 may be provided with a hollow portion 61*a* for inserting the shaft member into the center of the shaft. The shaft member is a member for rotating the container body 10 when forming the reinforcing member 40 (for example, forming by a filament winding method). The hollow portion 61*a* may have the same diameter as the diameter of the communication passages 21 and 31 of the connectors 20 and 30. In addition, the end surface of the straight corresponding unit 61 in the shaft direction may come into contact with the inner surfaces of the connectors 20 and 30 in the shaft direction when the connectors 20 and 30 are attached to the container body 10.

The dome corresponding units 62 and 63 are dome-shaped (for example, hemispherical) parts formed at both end portions of the storage member 60 in the shaft direction. The curved outer surfaces of the dome corresponding units 62 and 63 face the curved inner surfaces of the dome portions 15 and 16 of the container body 10. The dome corresponding units 62 and 63 may be formed in a hoop-like shape obtained by excluding the parts where the connectors 20 and 30 are inserted from the hemisphere. The dome corresponding units 62 and 63 protrude on the outer side in the shaft direction from the end surface of the straight corresponding unit 61 in the shaft direction.

Figure 3A:
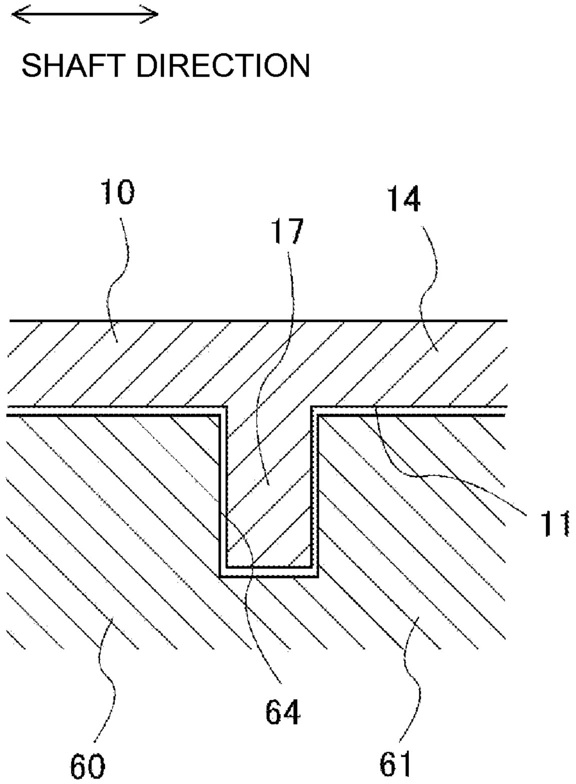
FIGS. 3A and 3B are views illustrating the structure of an engagement part of a container body and a storage member of the gas container of the first embodiment.
Figure 3B:
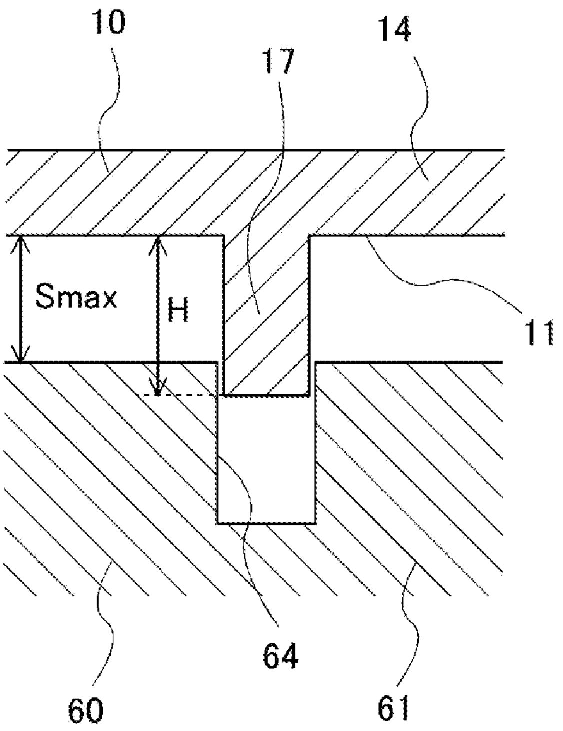
Figure 4:
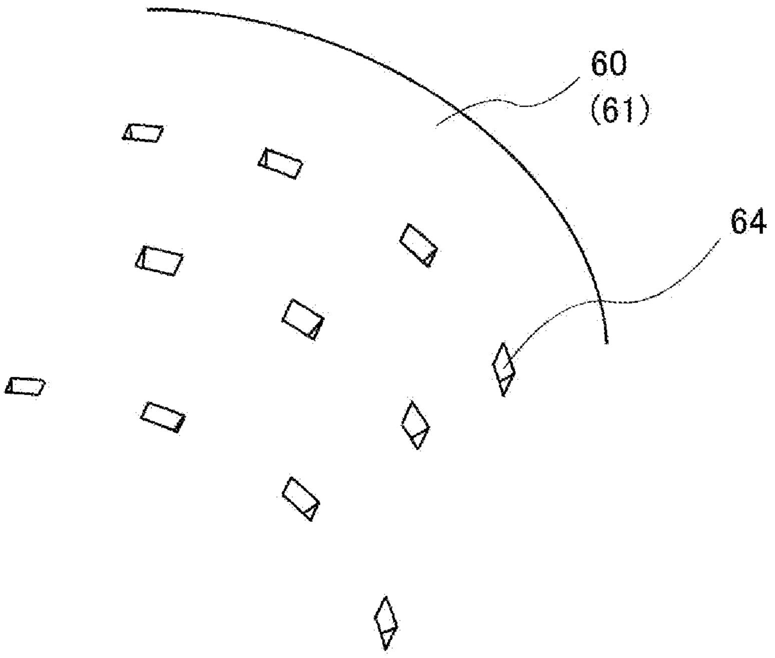
FIG. 4 is a perspective view of the outer surface of the storage member included in the gas container of the first embodiment, viewed from the outside.

The storage member 60 has a recess portion 64 as illustrated in FIGS. 2, 3, and 4. The recess portion 64 is a part that is provided on the outer surface of the storage member 60 (specifically, the radial outer surface of the straight corresponding unit 61) and is recessed inwardly (specifically, radial inner side). The recess portion 64 may be provided on the outer surface of the dome corresponding units 62 and 63.

Figure 5:
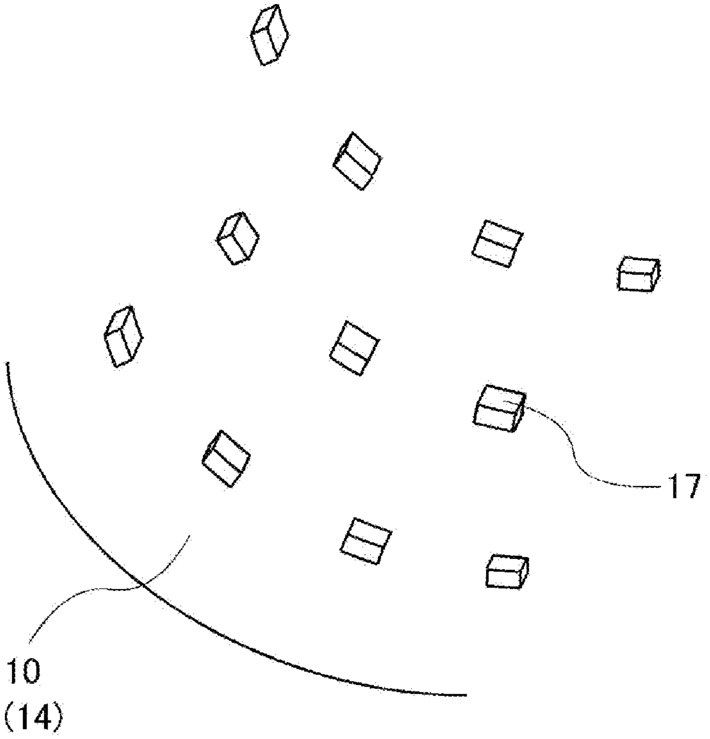
FIG. 5 is a perspective view of an inner surface of the container body of the gas container of the first embodiment, viewed from the inside.

The container body 10 has a projection portion 17 as illustrated in FIGS. 2, 3, and 5. The projection portion 17 is a part that is provided on the inner surface of the container body 10 (specifically, the radial inner surface of the straight portion 14) and protrudes outward (specifically, radial outer side). The projection portion 17 may be provided on the outer surface of the dome portions 15 and 16.

The recess portion 64 of the storage member 60 and the projection portion 17 of the container body 10 are engaged with each other. The engagement between the recess portion 64 and the projection portion 17 is performed such that the storage member 60 is restricted from moving in the shaft direction relative to the container body 10 in the internal space 11 and is restricted from rotating around the shaft. The recess portion 64 has an end surface in the shaft direction facing in the shaft direction and an end surface in the rotational direction facing in the rotational direction around the center of the shaft. The projection portion 17 has an end surface in the shaft direction facing in the shaft direction and an end surface in the rotational direction facing in the rotational direction around the center of the shaft. The end surfaces of the recess portion 64 and the projection portion 17 in the shaft direction face each other without being inclined with respect to the shaft direction, and the end surfaces of the recess portion 64 and the projection portion 17 in the rotational direction face each other without being inclined with respect to the rotational direction.

The recess portion 64 may be provided at one location on the outer surface of the storage member 60, or may be provided at a plurality of locations to be scattered. The projection portion 17 may be provided at one location on the inner surface of the container body 10, or may be provided at a plurality of locations to be scattered. In a structure in which a plurality of recess portions 64 and projection portions 17 are respectively provided, a plurality of recess portions 64 and projection portions 17 may be arranged at intervals in the shaft direction as illustrated in FIGS. 2, 4, and 5, and may be arranged at intervals in the rotational direction.

The recess portion 64 and the projection portion 17 are formed such that the recess portion 64 and the projection portion 17 are continuously engaged with each other when each of the container body 10 and the storage member 60 is deformed due to an increase in the temperature or the internal pressure of the internal space 11. The formation of the recess portion 64 and the projection portion 17 is set in consideration of the difference in the amount of deformation between the container body 10 and the storage member 60 when the maximum temperature and the maximum internal pressure assumed in the internal space 11 occur.

For example, as illustrated in FIGS. 3A and 3B, the projection portion 17 is formed such that a length H from the general surface of the radial inner surface of the container body 10 to the tip end of the projection portion 17 is greater than a radial distance Smax between the general surface of the radial inner surface the container body 10 and the general surface of the radial outer surface of the storage member 60 when the maximum temperature and maximum internal pressure assumed in the internal space 11 are generated.

An example of a method for manufacturing the gas container 1 will be described below. First, the pellet-shaped storage member 60 having the straight corresponding unit 61 and the dome corresponding units 62 and 63 is prepared. Then, the container body 10 is insert-molded by inserting the storage member 60 into a molding die for molding the container body 10 and then pouring liner resin.

Next, the connectors 20 and 30 are attached to the insert-molded container body 10 together with a sealing member, and a shaft member for rotating the container body 10 is inserted into the hollow portion 61*a* through the communication passage 31 of the connector 30. Then, the outer surface of the container body 10 is covered with the reinforcing member 40 by a filament winding (FW) method. Finally, the shaft member is removed from the hollow portion 61*a* to manufacture the gas container 1.

The function of the gas container 1 will be described. In the gas container 1, a storage member 60 that absorbs and releases gas is disposed in the internal space 11 of the container body 10. The storage member 60 has a recess portion 64 provided on the radial outer surface. The container body 10 has the projection portion 17 provided on the radial inner surface. The recess portion 64 of the storage member 60 and the projection portion 17 of the container body 10 are engaged with each other. The engagement is performed such that the storage member 60 is restricted from moving in the shaft direction relative to the container body 10 in the internal space 11 and is restricted from rotating around the shaft.

Therefore, according to the gas container 1, the storage member 60 can be restricted from moving in the shaft direction with respect to the container body 10 in the internal space 11, and can also be restricted from rotating in the rotational direction, and thus a fixing and holding (specifically, fixing and holding in both the shaft direction and the rotational retention) of the storage member 60 in the internal space 11 can be realized.

For accommodating the storage member 60 in the internal space 11 of the container body 10, it is not necessary to use a separate accommodation member for holding the storage member 60 in the internal space 11 thereof. That is, the storage member 60 is directly accommodated in the internal space 11 of the container body 10 and is fixed and held in the container body 10 by the engagement between the recess portion 64 and the projection portion 17. With such structure, the volume occupied by the storage member 60 in the internal space 11 can be increased, and thus the amount of gas to be stored in the internal space 11 can be increased. Since there is no member such as the accommodation member that inhibits heat conduction in the internal space 11, the entire internal space 11 can be thermally uniformized, the temperature of the storage member 60 can be uniformized, and the absorbing and releasing performance of the storage member 60 can be improved.

Therefore, according to the gas container 1, it is possible to secure a sufficient amount of gas to be stored in the internal space 11 of the container body 10 and to fix and hold the storage member 60.

In the gas container 1, the recess portion 64 of the storage member 60 and the projection portion 17 of the container body 10 are engaged with each other as described above.

The recess portion 64 and the projection portion 17 are formed such that the recess portion 64 and the projection portion 17 are continuously engaged with each other when each of the container body 10 and the storage member 60 is deformed due to an increase in the temperature or the internal pressure of the internal space 11. Therefore, even when the container body 10 and the storage member 60 (particularly, the container body 10) are deformed to the maximum extent, the engagement between the recess portion 64 and the projection portion 17 is not released and the projection portion 17 is removed from the recess portion 64. Therefore, it is possible to fix and hold the storage member 60 relative to the container body 10 and reliably prevent the storage member 60 from moving or rotating relative to the container body 10 in the internal space 11.

In the gas container 1, the container body 10 has the straight portion 14 formed in a tubular shape at the center in the shaft direction, and dome portions 15 and 16 formed in a dome shape at both end portions in the shaft direction. The storage member 60 is formed along the inner surfaces of the straight portion 14 and the dome portions 15 and 16 and has the straight corresponding unit 61 and the dome corresponding units 62 and 63. That is, the storage member 60 has not only a straight corresponding unit 61 along the inner surface of the straight portion 14 of the container body 10 but also dome corresponding units 62 and 63 along the inner surfaces of the dome portions 15 and 16 of the container body 10.

In such structure, when the storage member 60 tries to move in the radial direction with respect to the container body 10 in the internal space 11, the movement is restricted by the contact between the straight portion 14 and the straight corresponding unit 61 and the contact between the dome portions 15 and 16 and the dome corresponding units 62 and 63. When the storage member 60 tries to move in the shaft direction with respect to the container body 10 in the internal space 11, the movement is restricted by the contact between the dome portions 15 and 16 and the dome corresponding units 62 and 63. Therefore, according to the gas container 1, the storage member 60 can be restricted from moving not only in the radial direction but also in the shaft direction with respect to the container body 10 in the internal space 11, and thus the fixing and holding function of the storage member 60 in the internal space 11 can be improved.

In the above structure, the storage member 60 is accommodated in the internal space 11 of the container body 10 with almost no gap between the storage member 60 and the container body 10. Therefore, the storage member 60 can be used to maximize the amount of gas that can be stored in the internal space 11, and thus the gas absorbing and releasing efficiency of the gas container 1 can be increased.

In the gas container 1, the storage member 60 is assembled to the container body 10 by insert molding. Therefore, the storage member 60 can be reliably placed in the internal space 11 of the container body 10, and the accommodation arrangement can be realized with almost no gap between the outer surface of the storage member 60 and the inner surface of the container body 10.

In the gas container 1, when the gas is supplied to the internal space 11 of the container body 10 through the connector 30, the gas first passes through the hollow portion 61*a* of the storage member 60 in the internal space 11 and then flows to the connector 20 side in the shaft direction. The gas that flowed into the internal space 11 is gradually absorbed by the storage member 60 on the outside in the radial direction while passing through the hollow portion 61*a*. Therefore, according to the gas container 1, the gas can be distributed throughout the internal space 11, and the gas concentration can be made uniform. As a result, the gas absorbing and releasing performance of the storage member 60 can be fully extracted, and the absorbing and releasing performance can be improved.

Incidentally, in the above embodiment, the engagement between the recess portion 64 of the storage member 60 and the projection portion 17 of the container body 10 is performed such that the storage member 60 is restricted from moving in the shaft direction relative to the container body 10 in the internal space 11 and from rotating around the shaft. However, the present disclosure is not limited thereto.

For example, when the storage member 60 is allowed to rotate in the rotational direction with respect to the container body 10 in the internal space 11, at least the recess portion 64 out of the recess portion 64 and the projection portion 17 may be provided annularly in the rotational direction such that the rotation is possible. When the storage member 60 is allowed to move in the shaft direction with respect to the container body 10 in the internal space 11, at least the recess portion 64 out of the recess portion 64 and the projection portion 17 may be provided linearly in the shaft direction such that the movement in the shaft direction is possible. When the storage member 60 is allowed to move in the spiral direction with respect to the container body 10 in the internal space 11, at least the recess portion 64 out of the recess portion 64 and the projection portion 17 may be provided to extend spirally in the shaft direction such that the movement in the spiral direction is possible.

In the above embodiment, the container body 10 is insert-molded with the storage member 60 inserted therein, and the storage member 60 is assembled and integrated with the container body 10 by insert molding. However, the present disclosure is not limited thereto, and the container body 10 may be formed by integrating a tubular split body and a dome-shaped split body, which are respectively formed by injection molding or the like, by welding or the like. In such modification, the storage member 60 is assembled to the tubular split body and one dome-shaped split body in the shaft direction, and then the other dome-shaped split body in the shaft direction is welded to the tubular split body. Accordingly, the storage member 60 may be integrated with the container body 10.

The present disclosure is not limited to the above-described embodiments and the like, and various modifications can be made without departing from the scope of the present disclosure.

Second Embodiment

A second embodiment of a gas container according to the present disclosure will be described below with reference to FIGS. 1, 6 to 9.

A gas container 1 according to an embodiment is a container that stores gas and releases the stored gas. The gas container 1 is mounted on a vehicle or the like that uses stored gas as fuel. The gas stored in the gas container 1 may be any type of gas, but is preferably a fuel gas such as hydrogen gas or natural gas. The pressure of the gas that can be stored in the gas container 1 may be any pressure, and may be a high pressure (for example, 100 MPa). That is, the gas container 1 may be a pressure container or a pressure resistant container.

Figure 6:
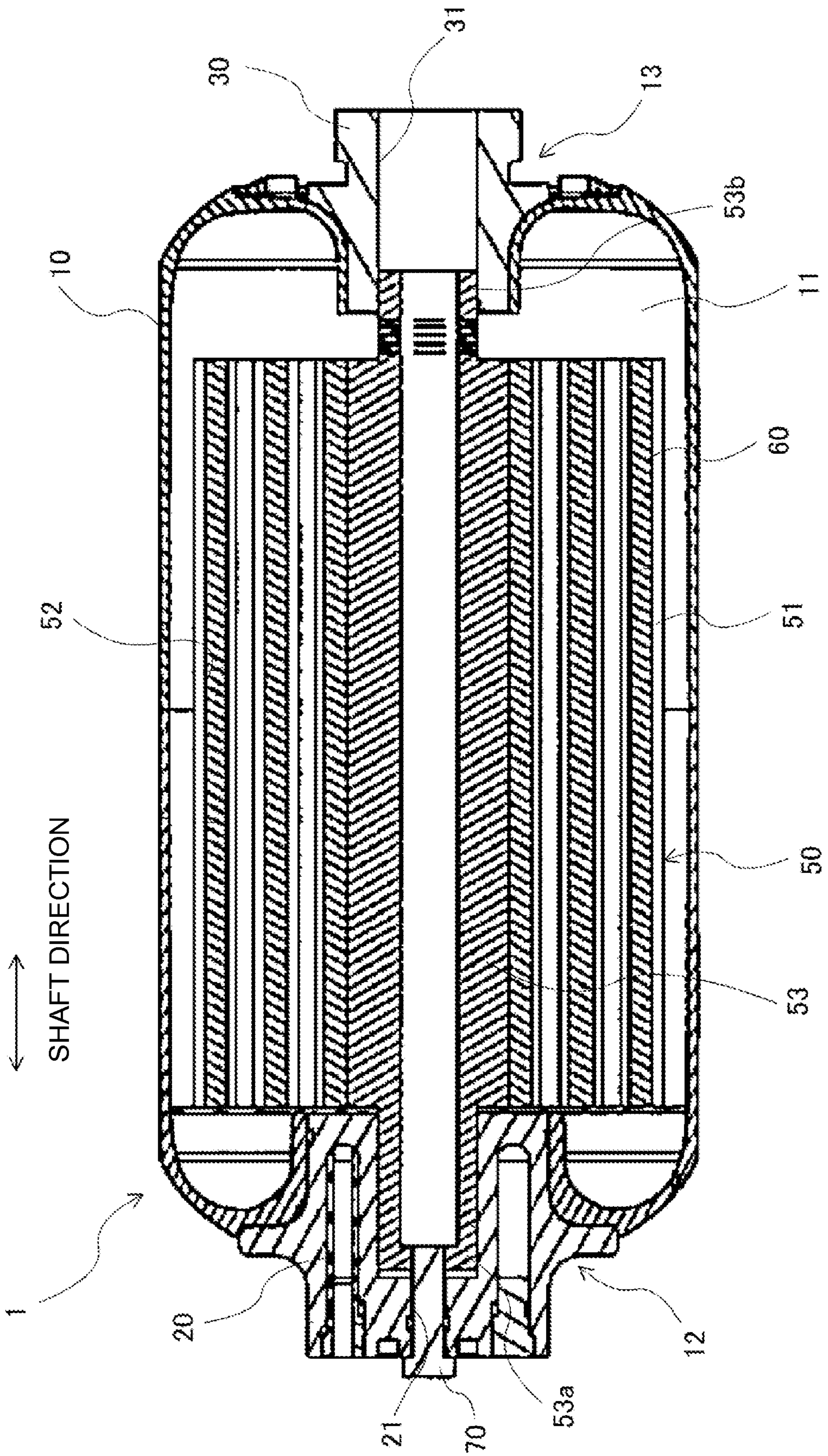
FIG. 6 is a sectional view of the gas container of a second embodiment.
Figure 7:
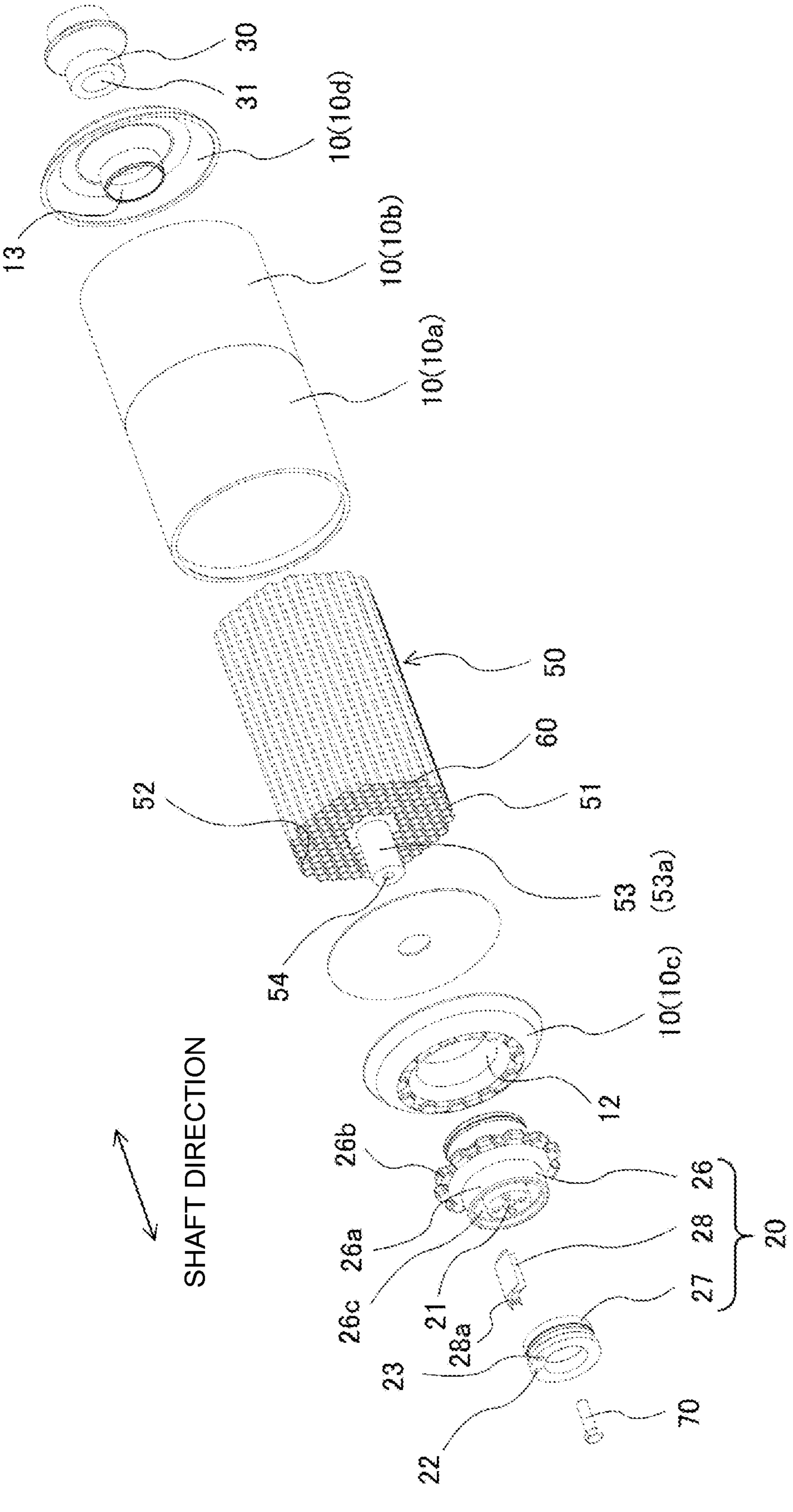
FIG. 7 is an exploded perspective view of the gas container of the second embodiment.

The gas container 1 includes a container body 10, connectors 20 and 30, a reinforcing member 40, an accommodation member 50, and a storage member 60, as illustrated in FIGS. 1, 6 and 7.

The container body 10 is a liner for storing gas. The container body 10 has an internal space 11. The internal space 11 has a capacity capable of storing a predetermined amount of gas. The container body 10 is made of a material having a gas barrier property that does not or hardly permeates the gas stored in the internal space 11. The material of the container body 10 may be selected according to the usage environment or the like of the gas container 1.

For example, when the gas is hydrogen, the material of the container body 10 is polyethylene resin, polypropylene resin, or the like. The inside of the container body 10 may be coated with a material having excellent gas barrier properties, such as ethylene-vinyl alcohol copolymer (EVOH). When the gas container 1 is used for residential use, and the mass of the gas container 1 may be large, the material of the container body 10 may be a metal material such as aluminum or stainless steel.

The container body 10 is formed in a tubular shape to enclose the internal space 11. The container body 10 is formed, for example, in a cylindrical shape or a regular polygonal cylindrical shape such that the gas pressure is uniformly distributed within the internal space 11. The container body 10 extends in the shaft direction. The container body 10 is formed such that the diameter of both end portions in the shaft direction is reduced from the center side in the shaft direction to the end sides in the shaft direction.

The container body 10 may be formed by connecting and integrating a plurality of split bodies by welding, deposition, or the like. For example, as illustrated in FIG. 7, the container body 10 includes two tubular cylindrical split bodies 10*a* and 10*b* and two dome-shaped dome split bodies 10*c* and 10*d*, and is formed in a state where the split bodies are arranged in the order of the dome split body 10*c*→the cylindrical split body 10*a*→the cylindrical split body 10*b*→the dome split body 10*d* from one end side in the shaft direction to the other end side in the shaft direction.

The container body 10 has opening portions 12 and 13. The opening portion 12 is a part that opens at one end of the container body 10 in the shaft direction. The opening portion 13 is a part that opens at the other end of the container body 10 in the shaft direction. The opening portions 12 and 13 are provided at both end portions of the container body 10 in the shaft direction and are formed, for example, in a circular shape. The connector 20 is inserted into the opening portion 12. The connector 30 is inserted into the opening portion 13.

The connectors 20 and 30 are members that allow gas to flow between the internal space 11 of the container body 10 and the outside. That is, the connectors 20 and 30 are used for introducing gas from the outside of the container body 10 into the internal space 11 and releasing gas from the internal space 11 to the outside of the container body 10. The connectors 20 and 30 are attached to the end portions of the container body 10 in the shaft direction. A sealing member such as an O-ring is interposed between the connectors 20 and 30 and the container body 10 to prevent leakage of gas from the internal space 11 of the container body 10 to the outside.

The connectors 20 and 30 have communication passages 21 and 31, respectively. The communication passages 21 and 31 are passages that allow the internal space 11 of the container body 10 to communicate with the outside. The communication passages 21 and 31 extend in the shaft direction and are formed, for example, in a columnar shape. The communication passages 21 and 31 are connected to gas pipes and valves (not illustrated).

The gas container 1 may allow gas to enter and exit through both the communication passages 21 and 31 of the connectors 20 and 30, or as illustrated in FIG. 6, gas may enter and exit only through one of the communication passages 21 and 31 (specifically, the communication passage 31), and a plug may be mounted on the other (specifically, the communication passage 21). The gas container 1 may have the connector 20 or the connector 30 attached to one of the end portions of the container body 10 in the shaft direction for allowing gas to enter and exit. The container body 10 may be formed separately from the connectors 20 and 30, and be integrated with the connectors 20 and 30 by inserting the connectors 20 and 30 after formation. The container body 10 may be integrally formed with the connectors 20 and 30 by, for example, insert molding.

The connectors 20 and 30 may function as heat exchangers in which a heat exchange medium circulates to adjust the temperature of the gas container 1. Although both the connectors 20 and 30 preferably function as heat exchangers, either one of the connectors 20 and 30 may function as a heat exchanger. For example, when gas enters and exits through one connector (for example, connector 30), the other connector (for example, connector 20) on the opposite side in the shaft direction may function as a heat exchanger. Hereinafter, in the present embodiment, it is assumed that gas enters and exits through the connector 30 and the connector 20 functions as a heat exchanger.

Figure 8A:
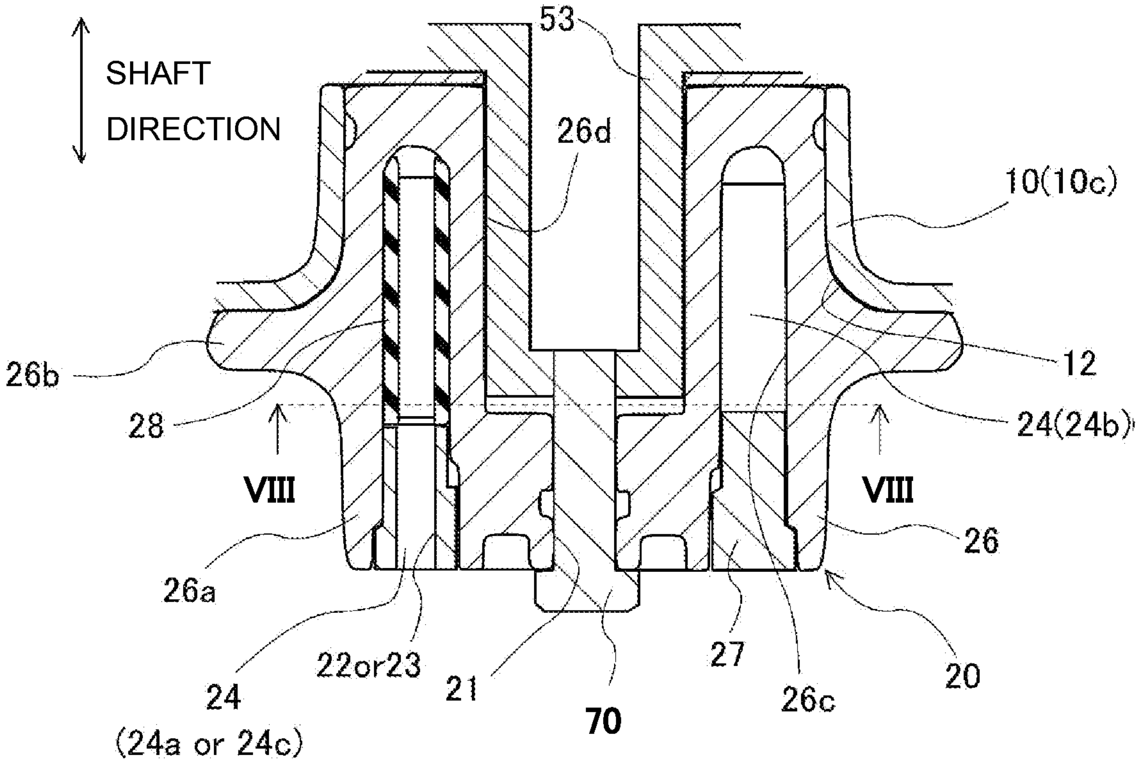
FIGS. 8A and 8B are sectional views of a connector provided in the gas container of the second embodiment.
Figure 8B:
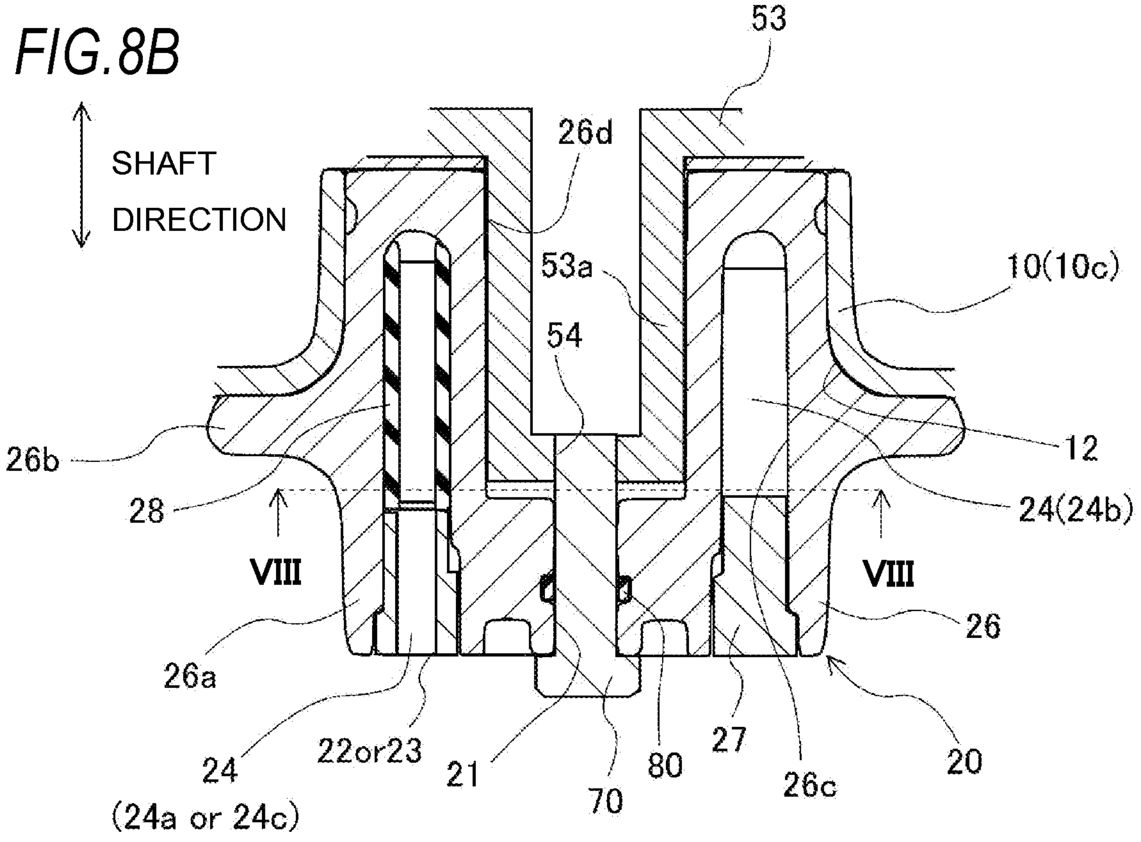
Figure 9:
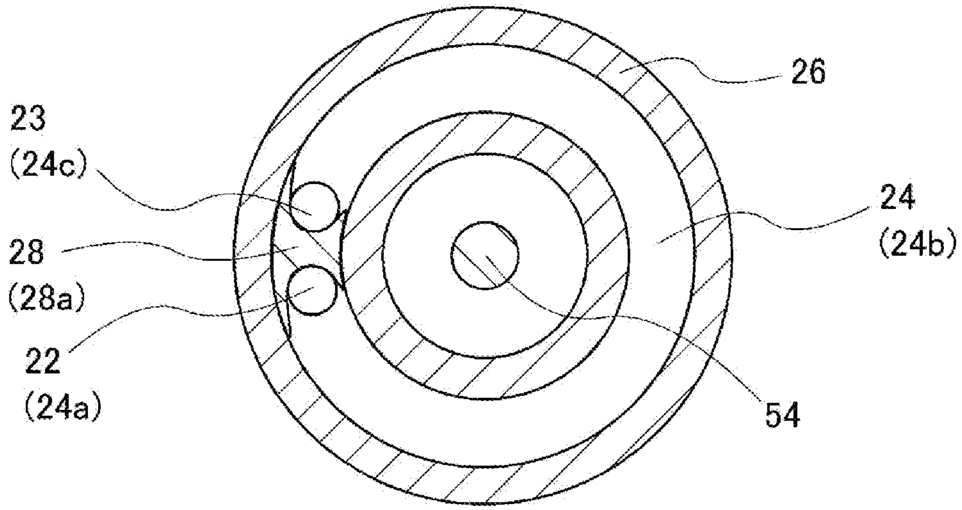
FIG. 9 is a sectional view of the gas container of the second embodiment taken along line IV-IV illustrated in FIGS. 8A and 8B.

The connector 20 has an inlet 22, an outlet 23, and a passage portion 24, as illustrated in FIGS. 7 to 9. The inlet 22 is an opening part through which a heat exchange medium flows from the outside. The inlet 22 is connected to an externally provided storage tank, pipes, and valves (none of which are illustrated). The outlet 23 is an opening part through which the heat exchange medium flows out toward the outside. The outlet 23 is connected to a storage unit or a pipe (none of which are illustrated) provided on the outside. The passage portion 24 is a pipe part having one end connected to the inlet 22 and the other end connected to the outlet 23, through which the heat exchange medium flows.

The heat exchange medium is a medium that exchanges heat with the internal space 11 and further the storage member 60 in the container body 10, and may be a liquid such as cooling water. The heat exchange medium flows into the inlet 22 from the outside, flows through the passage portion 24, and then flows out from the outlet 23 to the outside.

The connector 20 has a connector body 26 and a lid body 27. Note that the connector 20 may include at least the connector body 26 and the lid body 27, and may include a wall body 28 separately. Hereinafter, in the present example, the connector 20 is configured including the wall body 28.

The connector body 26 is a body member of the connector 20. The connector body 26 is made of metal such as aluminum or stainless steel to secure rigidity. The connector body 26 has a shaft portion 26*a* and a flange portion 26*b*. The shaft portion 26*a* is a part extending in the shaft direction. The shaft portion 26*a* is formed in a shape (for example, a cylindrical shape) that fits into the opening portion 12 of the container body 10. The communication passage 21 is provided at the center of the shaft portion 26*a*. The flange portion 26*b* is a part that expands in the radial direction. The flange portion 26*b* is integrated with the shaft portion 26*a*. The flange portion 26*b* is formed in a shape that follows the outer surface of the dome split body 10*c* of the container body 10 from the outer surface of the shaft portion 26*a* toward the radial outer side.

A groove portion 26*c* is formed in the connector body 26. Specifically, the groove portion 26*c* is formed to open outward in the shaft direction on the end surface of the shaft portion 26*a* of the connector body 26 in the shaft direction. The depth of the groove portion 26*c* in the shaft direction is set such that the groove portion 26*c* approaches the end surface in the shaft direction on the opposite side of the shaft portion 26*a* as much as possible. As illustrated in FIGS. 7 and 9, the groove portion 26*c* is formed in an annular shape to extend continuously in the circumferential direction around the center in the shaft direction of the shaft portion 26*a*. Note that the cross section of the groove portion 26*c* may be, for example, a quadrangular shape composed of a bottom surface and a side surface, or may be a curved semicircular shape.

The lid body 27 is a member that closes the groove portion 26*c* of the connector body 26. The lid body 27 is made of resin such as polyethylene, polypropylene, or polyvinyl chloride, which has a lower thermal conductivity than the connector body 26. The lid body 27 is formed in an annular shape to match the groove portion 26*c*, and is also formed in a tubular shape (for example, a cylindrical shape). The length of the lid body 27 in the shaft direction is shorter than the depth of the groove portion 26*c* in the shaft direction such that a space is formed between the connector body 26 and the lid body 27 in the groove portion 26*c*.

Each of the inlet 22, the outlet 23, and the passage portion 24 has a necessary and sufficient size (for example, area, cross-sectional area, and length) to perform heat exchange between the heat exchange medium and the storage member 60. The inlet 22 and the outlet 23 are formed in the lid body 27 (specifically, the end surface in the shaft direction). The inlet 22 and the outlet 23 are not arranged at symmetrical positions across the center of the shaft of the lid body 27, but are arranged at asymmetrical positions to approach each other in the circumferential direction. To prevent pressure loss of the heat exchange medium due to rapid diameter expansion or contraction of the flow path, the flow path near the inlet 22 or the outlet 23 is preferably configured to gradually increase or decrease in diameter.

The inlet 22 and the outlet 23 respectively communicate with the passage portion 24. The passage portion 24 is formed in the connector body 26 and the lid body 27. The passage portion 24 is formed including a space between the connector body 26 and the lid body 27 in the groove portion 26*c*. As illustrated in FIGS. 8A, 8B and 9, the passage portion 24 has a first passage portion 24*a*, a second passage portion 24*b*, and a third passage portion 24*c*.

The first passage portion 24*a* is a part formed in the lid body 27 to be connected to the inlet 22. The first passage portion 24*a* extends in the shaft direction as a through-hole penetrating the lid body 27. The second passage portion 24*b* is a part formed between the connector body 26 and the lid body 27 in the groove portion 26*c*. The second passage portion 24*b* is interposed between the first passage portion 24*a* and the third passage portion 24*c*. The second passage portion 24*b* is a space surrounded by the connector body 26 and the lid body 27, which remains behind the groove portion 26*c* in the shaft direction when the lid body 27 closes the opening side of the groove portion 26*c* of the connector body 26 in the shaft direction. The passage portion 24 extends annularly around the shaft. The third passage portion 24*c* is a part formed in the lid body 27 to be continuous with the outlet 23. The third passage portion 24*c* extends in the shaft direction as a through-hole penetrating the lid body 27.

The wall body 28 is a division member that partitions the groove portion 26*c* into the inlet 22 side and the outlet 23 side by dividing a part of the annular groove portion 26*c*. The wall body 28 is disposed at an intermediate position between the inlet 22 and the outlet 23 which are adjacent to each other in the circumferential direction within the groove portion 26*c*. The wall body 28 has a division portion 28*a*. The division portion 28*a* closes a part of the groove portion 26*c* to form a C-shaped passage portion 24 around the shaft. The wall body 28 cuts off the shortest path out of the two paths connecting the inlet 22 and the outlet 23 in the annular groove portion 26*c* (for example, a clockwise path and a counterclockwise path when viewed from the inlet 22), and makes the long path function as the passage portion 24.

The wall body 28 is made of resin such as polyethylene, polypropylene, or polyvinyl chloride, which has a lower thermal conductivity than the connector body 26. The wall body 28 is configured separately from the connector body 26 and the lid body 27. The wall body 28 is attached to at least one of the connector body 26 and the lid body 27 and fixed to the connector body 26 and the lid body 27 such that movement within the groove portion 26*c* is restricted.

The reinforcing member 40 is a member that covers the radial outer surface of the container body 10 to reinforce the container body 10. The reinforcing member 40 is preferably used particularly when the gas container 1 is a pressure resistant container. The reinforcing member 40 is made of, for example, resin-impregnated high-strength fibers (that is, FRP). The high-strength fibers are carbon fibers, glass fibers, aramid fibers, and the like. The resin impregnated into the high-strength fiber is thermosetting resin such as epoxy resin, unsaturated polyester resin, or vinyl ester resin.

For example, the reinforcing member 40 may be formed as a helical layer or a hoop layer by winding high-strength fibers impregnated with resin around the outer surface of the container body 10, or may be formed as a sheet-shaped helical layer or hoop layer using resin and high-strength fibers adheres to the outer surface of the container body 10. The reinforcing member 40 may be formed by heating and curing resin after forming the helical layer and the hoop layer.

The accommodation member 50 is a member that accommodates a storage member 60, which will be described in detail later. The accommodation member 50 is disposed in the internal space 11 of the container body 10. The accommodation member 50 is formed in a tubular shape extending in the shaft direction of the gas container 1. The accommodation member 50 is formed in a honeycomb shape. The accommodation member 50 has a partition wall 51 and an accommodation space 52.

The partition wall 51 is a plate-like wall portion that partitions the accommodation space 52. The accommodation space 52 is a space that accommodates the storage member 60. The storage member 60 is accommodated in the accommodation space 52 and held by the partition wall 51. A plurality of accommodation spaces 52 are provided. The plurality of accommodation spaces 52 are arranged in the radial direction from the center of the shaft and in the radial direction around the center of the shaft such that the honeycomb shape of the accommodation member 50 is formed.

Each of the accommodation spaces 52 extends in a columnar shape in the shaft direction. A cross section obtained by cutting each accommodation space 52 along a surface perpendicular to the shaft direction may be a regular polygonal shape such as a regular hexagon. When the accommodation space 52 has a regular hexagonal cross section, the accommodation space 52 is partitioned by six partition walls 51. The cross-sectional shape of each accommodation space 52 may be constant regardless of the position in the shaft direction. All of the accommodation spaces 52 may be formed in the same shape, or may be formed in different shapes. The two accommodation spaces 52 adjacent to each other may be divided in a state where the partition walls 51 that separate each accommodation space 52 are in contact with each other, or may be divided by one common partition wall 51.

The partition wall 51 is formed in a shape corresponding to the shape of the accommodation space 52. The partition wall 51 is stretched around the plurality of accommodation spaces 52 in the internal space 11 of the container body 10. The partition wall 51 is made of a heat conductive material and functions as a heat exchanger. The heat conductive material that forms the partition wall 51 is a material of which thermal conductivity at room temperature (for example, 25° C.) is higher than thermal conductivity of air, and specifically, examples thereof include metal, alloy, and ceramics represented by stainless steel, aluminum, alumina, silicon carbide, and the like.

The partition wall 51 may be formed by integrating plate materials by welding or bonding, or may be formed by extruding and firing a ceramic raw material. The thickness of the partition wall 51 is not excessively large considering reducing the weight of the gas container 1 and increasing the gas storage amount, and is preferably less than 1 mm, for example.

The partition wall 51 may have a connection passage that connects the accommodation spaces 52 that are adjacent to each other. The connection passage is provided to distribute the gas evenly throughout the internal space 11 to make the gas concentration and heat in the internal space 11 uniform or substantially uniform, thereby improving the gas absorbing and releasing performance. One or more connection passages may be provided for each partition wall 51, and when two or more connection passages are provided for one partition wall 51, the connection passages may be separated in the shaft direction continuously or intermittently.

The center of the accommodation member 50 is formed hollow. A coupling unit 53 is integrated with the center of the accommodation member 50. The coupling unit 53 is formed in a hollow tubular shape and extends toward the connector 20 side and the connector 30 side in the shaft direction. One end side in the shaft direction, which is the connector 20 side of the coupling unit 53, protrudes outward in the shaft direction from one end of the accommodation member 50 (specifically, the partition wall 51) in the shaft direction. The other end side in the shaft direction, which is the connector 30 side of the coupling unit 53, protrudes outward in the shaft direction from the other end of the accommodation member 50 (specifically, the partition wall 51) in the shaft direction. The coupling unit 53 is made of the same material as the partition wall 51.

The connectors 20 and 30 and the accommodation member 50 have an uneven structure that fits together. Specifically, one end side of the coupling unit 53 of the accommodation member 50 in the shaft direction is fitted to the connector body 26 of the connector 20. One end side of the coupling unit 53 in the shaft direction is assembled in contact with the connector body 26. The connector body 26 has a fitting groove 26*d*. The coupling unit 53 has a fitting projection portion 53*a*.

The fitting groove 26*d* is a groove portion into which the fitting projection portion 53*a* is fitted. The fitting groove 26*d* is formed to be open on the inner end surface of the shaft portion 26*a* of the connector body 26 in the shaft direction and extend outward in the shaft direction from the opening. The fitting groove 26*d* and the communication passage 21 communicate with each other. The diameter of the fitting groove 26*d* is larger than the diameter of the communication passage 21.

The fitting projection portion 53*a* is a part that fits into the fitting groove 26*d*. The fitting projection portion 53*a* is provided on one end side of the coupling unit 53 in the shaft direction. The fitting projection portion 53*a* protrudes in the shape of a shaft outward in the shaft direction from one end of the accommodation member 50 (specifically, the partition wall 51) in the shaft direction. To secure the contact between the fitting projection portion 53*a* of the coupling unit 53 and the fitting groove 26*d* of the connector body 26, the fitting projection portion 53*a* and the fitting groove 26*d* may be formed in a tapered shape to gradually increase or decrease in diameter. To increase the contact area between the accommodation member 50 and the connector body 26, heat transfer fins may be attached to one end portion of the coupling unit 53 or the accommodation member 50 in the shaft direction.

As a method for fixing the connector 20 and the accommodation member 50 that are fitted to each other with the uneven structure, various methods can be employed. The fixation may be performed by means of press-fitting, bolting, screwing, deposition, welding, and the like, as long as the relative movement between the connector 20 and the accommodation member 50 can be prevented.

In the present example, the gas container 1 has a fixing member 70 as illustrated in FIGS. 6, 7, 8A and 8B. The fixing member 70 is a member that fixes the connector 20 and the accommodation member 50. Specifically, the fixing member 70 is a shaft member having a male screw. The fixing member 70 is configured separately from the connector 20 and the accommodation member 50. The fitting projection portion 53*a* of the coupling unit 53 of the accommodation member 50 has a hole portion 54. The hole portion 54 is a part in which a female screw corresponding to the male screw of the fixing member 70 is formed. The hole portion 54 is provided to penetrate through the end surface portion in the shaft direction on one end side of the fitting projection portion 53*a* in the shaft direction.

The connector body 26 of the connector 20 has the communication passage 21 provided in the shaft portion 26*a*. The communication passage 21 is, as described above, a passage that allows the internal space 11 of the container body 10 to communicate with the outside. The communication passage 21 is a through-hole through which the fixing member 70 is inserted penetrating the connector body 26. The fixing member 70 is inserted through the communication passage 21 from the outside of the connector 20 and screwed to the coupling unit 53. The connector 20 and the accommodation member 50 are fastened to each other while the fixing member 70 is inserted through the communication passage 21 of the connector body 26 by screwing the male screw of the fixing member 70 and the female screw of the accommodation member 50 (specifically, the hole portion 54 of the fitting projection portion 53*a* of the coupling unit 53).

The other end side of the coupling unit 53 in the shaft direction is fitted to the connector 30 and is assembled in contact with the connector 30. The coupling unit 53 has a fitting projection portion 53*b*. The communication passage 31 of the connector 30 forms a fitting groove into which the fitting projection portion 53*b* is fitted. The fitting projection portion 53*b* is provided on the other end side of the coupling unit 53 in the shaft direction. The fitting projection portion 53*b* protrudes in the shape of a shaft outward in the shaft direction from the other end of the accommodation member 50 (specifically, the partition wall 51) in the shaft direction.

As a method for fixing the connector 30 and the accommodation member 50 that are fitted to each other with the uneven structure, various methods can be employed. The fixation may be performed by means of press-fitting, bolting, screwing, deposition, welding, and the like, as long as the relative movement between the connector 30 and the accommodation member 50 can be prevented. In the present example, the connector 30 and the accommodation member 50 are screwed together.

A male screw is formed on the radial outer surface of the fitting projection portion 53*b* of the coupling unit 53. A female screw is formed on the radial inner surface that constitutes the communication passage 31 of the connector 30. The connector 30 and the accommodation member 50 are fastened to each other by screwing the female screw of the connector 30 and the male screw of the fitting projection portion 53*b* of the coupling unit 53.

The gas container 1 can include a sealing member 80 as illustrated in FIG. 8B. The sealing member 80 is a member that seals the internal space 11 of the container body 10 from the outside. The sealing member 80 is interposed between the fixing member 70 and the connector body 26 and seals the internal space 11 in a state where the fixing member 70 is inserted through the communication passage 21 of the connector body 26 of the connector 20. The sealing member 80 is formed, for example, in an annular shape, and is arranged between the outer surface of the fixing member 70 in the shaft portion and the inner surface that forms the communication passage 21 of the connector body 26. The sealing member 80 is an O-ring or the like.

The gas container 1 may be provided with a sealing member interposed between the connectors 20 and 30 and the accommodation member 50 to seal the internal space 11. For example, the sealing member applied to the connector 20 side may be disposed between the radial inner surface of the fitting groove 26*d* of the connector body 26 and the radial outer surface of the fitting projection portion 53*a* of the coupling unit 53, or may be disposed between the inner end surface of the shaft portion 26*a* of the connector body 26 in the shaft direction and the outer end surface of the general unit of the coupling unit 53 in the shaft direction. The general unit of the coupling unit 53 is a part of which the diameter is larger than the outer diameter of the fitting projection portion 53*a*, and specifically, a part which is sandwiched between the fitting projection portion 53*a* and the fitting projection portion 53*b*, positioned in the middle in the shaft direction, and fitted into the hollow portion of the accommodation member 50.

The storage member 60 is a member that absorbs and releases gas. The storage member 60 is accommodated in the accommodation space 52 and held by the partition wall 51. Note that the storage member 60 may be accommodated in all of the accommodation spaces 52 of the accommodation member 50, or may be accommodated in a limited part of all of the accommodation spaces. The reason of the accommodation space 52 in which the storage member 60 is accommodated being limited to a part is because the accommodation space 52 in which the storage member 60 is not accommodated is made to function as a gas flow path, and the gas concentration in the internal space 11 is made uniform.

The storage member 60 is formed in a columnar shape following the shape of the accommodation space 52. The storage member 60 extends in the shaft direction. A cross section obtained by cutting the storage member 60 along a surface orthogonal to the shaft direction corresponds to the cross section of the accommodation space 52, and may be, for example, a regular polygon such as a regular hexagon. The storage member 60 is made of a material suitable for the type of gas to be stored. Materials of the storage member 60 are, for example, porous carbon materials such as carbon nanotubes, porous metal complexes (that is, MOFs), zeolites, hydrogen absorbing alloys, metal hydrides, and the like.

The storage member 60 may be formed in a state where powders such as primary particles and secondary particles are solidified, that is, in the shape of pellets. According to the pellet-shaped storage member 60, a large contact area of the storage member 60 with respect to the gas can be secured, and thus the gas absorbing and releasing performance can be improved. Note that the volume of the storage member 60 is preferably close to 100% of the volume of the accommodation space 52 to secure the gas storage amount, but may be 90% or more. The storage member 60 is formed by cross-linking the storage member powder with a cross-linking agent or binding the storage member powder with a binder. The cross-linking agents and binders are made of, for example, silicon-based, epoxy-based, or amine-based materials.

Note that the storage member 60 has properties that change according to the position in the shaft direction. Specifically, the storage member 60 may be configured to be more resistant to breakage at the end portion in the shaft direction than at the center in the shaft direction. The breakage resistance may be an indicator of the difficulty of powderization of the powdered storage member 60. The breakage resistance can be called strength, rigidity, wear resistance, viscosity, elastic force, and the like.

When the amount of the cross-linking agent or the like that cross-links the material powder of the storage member 60 increases, the amount of the storage member 60 that can be accommodated in the accommodation space 52 is reduced by that amount, the amount that the storage member 60 can store gas is reduced, and as a result, the absorbing and releasing performance of the storage member 60 deteriorates. Therefore, in the storage member 60, when the breakage resistance of the end portion in the shaft direction is higher than that of the center in the shaft direction, the absorbing and releasing performance of the end portion in the shaft direction deteriorates more than that of the center in the shaft direction.

An example of a method for manufacturing the gas container 1 will be described below. First, the two cylindrical split bodies 10*a* and 10*b* and the two dome split bodies 10*c* and 10*d* that form the container body 10 are prepared by injection molding or the like. Then, the connector 20 and the sealing member are mounted to the opening portion 12 of one dome split body 10*c*, and the connector 30 and the sealing member are mounted to the opening portion 13 of the other dome split body 10*d*. A honeycomb-shaped accommodation member 50 is prepared, and a pellet-shaped storage member 60 is prepared. Then, the storage member 60 is inserted into the accommodation space 52 of the accommodation member 50.

Next, the fitting projection portion 53*b* of the coupling unit 53 of the accommodation member 50 is screwed into the connector 30 and brought into contact with the connector 30, and the accommodation member 50 is assembled and fixed to the connector 30. Then, the cylindrical split bodies 10*b* and 10*a* are connected (for example, welded) to the other dome split body 10*d* to which the connector 30 is mounted. The accommodation member 50 is temporarily assembled to the connector 20 by fitting the fitting projection portion 53*a* of the coupling unit 53 into the fitting groove 26*d* of the connector body 26 and bringing the fitting projection portion 53*a* into contact with the connector 20. Next, the one dome split body 10*c* to which the connector 20 is mounted and the cylindrical split body 10*a* are connected (for example, welded) to each other. Then, the fixing member 70 is screwed to the accommodation member 50 to assemble and fix the accommodation member 50 to the connector 20.

Finally, the outer surface of the container body 10 is covered with the reinforcing member 40 by a filament winding (FW) method. Thus, the gas container 1 is manufactured.

The operation and action of the gas container 1 will be described. In the manufactured gas container 1, when gas is supplied to the internal space 11 of the container body 10 through the connector 30, the gas flows from the end surface in the shaft direction on the connector 30 side of the accommodation member 50 disposed in the accommodation space 11 into each of the accommodation spaces 52 of the accommodation member 50 through the inside of the hollow of the coupling unit 53. The gas that flowed into the accommodation space 52 flows from the connector 30 side of the accommodation space 52 to the connector 20 side, and is gradually absorbed by the storage member 60 accommodated and held in the accommodation space 52.

The gas that flowed into the accommodation space 52 in which the storage member 60 is not disposed among all the storage spaces 52, flows through the accommodation space 52 from the connector 30 side to the connector 20 side. Here, in a structure in which the partition wall 51 has a connection passage that connects adjacent storage spaces 52 to each other, some of the gas that flowed through the accommodation space 52 flows into the adjacent accommodation space 52 through the connection passage.

Thus, in the gas container 1, the entire internal space 11 can be uniformly filled with gas, and the gas concentration is made uniform. In particular, according to a structure in which the storage member 60 is not disposed at some of all of the accommodation spaces 52 or a structure in which the above-mentioned connection passage is provided in the partition wall 51, the gas flow path can be stretched around the entire internal space 11, and thus, the gas can be distributed throughout the internal space 11.

In the gas container 1 described above, the accommodation member 50 for accommodating and holding the storage member 60 is arranged in the internal space 11 of the container body 10. The accommodation member 50 has partition walls 51 that partition the accommodation spaces 52, and is formed in a honeycomb shape in which the partition walls 51 are stretched such that the plurality of accommodation spaces 52 are regularly arranged in the internal space 11. The storage member 60 is accommodated in the accommodation space 52 and held by the partition wall 51. The partition wall 51 is made of a heat conductive material. Therefore, the internal space 11 is made thermally uniform over the entire space, and thus the temperature of the storage member 60 in the internal space 11 is made uniform.

Note that the partition wall 51 is in contact with the connectors 20 and 30 via the coupling unit 53 and is in thermal communication with the connectors 20 and 30. Here, the partition wall 51 indirectly exchanges heat with the connectors 20 and 30, and thus the temperature of the internal space 11 and the storage member 60 is efficiently and quickly controlled. Therefore, according to the gas container 1, the gas can be smoothly absorbed into the storage member 60 in the internal space 11 and the gas can be released from the storage member 60 smoothly.

In the gas container 1, the connector 20 functions as a heat exchanger through which a heat exchange medium circulates in order to adjust the temperature of the gas container 1. The connector body 26 of the connector 20 is made of metal and is in contact with the coupling unit 53 of the accommodation member 50 that accommodates and holds the storage member 60. The connector 20 has the inlet 22 through which the heat exchange medium flows, the outlet 23 through which the heat exchange medium flows out, and the passage portion 24 which has one end connected to the inlet 22 and the other end connected to the outlet 23, and through which the heat exchange medium flows.

In the connector 20, the heat exchange medium flows into the inlet 22 from the outside of the connector 20, flows through the passage portion 24, and flows out of the connector 20 from the outlet 23. When the heat exchange medium circulates through the inside and outside of the connector 20 as such, heat is exchanged between the heat exchange medium and the accommodation member 50 and the storage member 60 in the internal space 11 of the container body 10. In particular, since the connector 20 and the accommodation member 50 are in contact with each other, the heat generated by the storage member 60 is easily transferred to the connector 20 through the accommodation member 50, and the heat is discharged to the outside through the heat exchange medium.

Therefore, according to the gas container 1, the storage member 60 can be cooled by circulation of the heat exchange medium through the inside and outside of the connector 20, and the temperature of the storage member 60 can be appropriately controlled. To control the temperature of the storage member 60, it is not necessary to dispose a pipe for circulating a heat exchange medium that exchanges heat with the storage member 60 in the internal space 11 of the container body 10.

Therefore, according to the gas container 1, the structure can be simplified to control the temperature of the storage member. Since the pipe space in the internal space 11 can be eliminated and the amount of the storage member 60 can be increased, the gas absorbing amount can be increased and the gas absorbing and releasing performance using the storage member 60 can be improved. The pipe for circulating the heat exchange medium that exchanges heat with the storage member 60 in the gas container 1 is limited to the connector 20. Therefore, to exchange heat using the same connector 20 even when the shape or size of the container body 10 (excluding the location where the connector 20 is attached) is changed, that is, to exchange heat using many types of container bodies 10, the connector 20 can be shared for heat exchange, and the manufacturing cost of the gas container 1 can be reduced.

In the gas container 1, the connector 20 has the connector body 26 in which the groove portion 26*c* is formed, and the lid body 27 that closes the groove portion 26*c*. The inlet 22 and the outlet 23 are formed in the lid body 27, and the passage portion 24 is formed including the space between the connector body 26 and the lid body 27 in the groove portion 26*c*. Specifically, a part of the passage portion 24 (specifically, the second passage portion 24*b*) is a space that remains behind the groove portion 26*c* when the lid body 27 closes the groove portion 26*c* of the connector body 26.

In such configuration, by attaching the lid body 27, in which the inlet 22 and the outlet 23 are formed and the first passage portion 24*a* and the third passage portion 24*c* are formed, to the connector body 26 and by closing the groove portion 26*c* of the connector body 26, the passage portion 24 (specifically, the second passage portion 24*b*) can be formed.

Therefore, by simplifying the structure for allowing the connector 20 to function as a heat exchanger, it is possible to facilitate the manufacturing of the gas container 1.

In the gas container 1, the groove portion 26*c* formed in the connector body 26 is formed in an annular shape around the shaft on the end surface of the shaft portion 26*a* of the connector body 26 in the shaft direction. The connector 20 has the wall body 28 that partitions the groove portion 26*c* into the inlet 22 side and the outlet 23 side to form the passage portion 24. Here, a C-shaped passage portion 24 is formed around the center of the connector 20 in the shaft direction by partially closing the groove portion 26*c* with the division portion 28*a* of the wall body 28. Therefore, since the temperature deviation around the center of the shaft of the connector 20 can be prevented, the temperature of the storage member 60 can be efficiently and quickly adjusted, and the storage member 60 can absorb and release gas smoothly.

In the gas container 1, the wall body 28 is provided separately from the connector body 26 and the lid body 27, and is made of resin. According to such configuration, compared to a configuration in which the wall body 28 is temporarily made of metal, heat exchange through the division portion 28*a* is less likely to occur between the relatively cold heat exchange medium that flows from the inlet 22 to the passage portion 24 (specifically, flows from the first passage portion 24*a* to the second passage portion 24*b*) and the relatively warm heat exchange medium that flows from the passage portion 24 to the outlet 23 (specifically, flows from the second passage portion 24*b* to the third passage portion 24*c*) Therefore, it is possible to promote heat exchange between the heat exchange medium in the passage portion 24 and the accommodation member 50 and the storage member 60. Accordingly, cooling of the storage member 60 can be performed appropriately and quickly by circulation of the heat exchange medium, and accuracy of temperature control of the storage member 60 can be improved.

The lid body 27 is made of resin, similar to the wall body 28. The lid body 27 closes the groove portion 26*c* of the connector body 26 to form the passage portion 24. According to such configuration, compared to a configuration in which the lid body 27 is temporarily formed of metal, the lid 27 can be prevented from reaching a high temperature, and the heat is easily transferred from the accommodation member 50 and the storage member 60 to the heat exchange medium in the passage portion 24. Therefore, it is possible to promote heat exchange between the heat exchange medium and the accommodation member 50 and the storage member 60. Accordingly, cooling of the storage member 60 can be performed appropriately and quickly by circulation of the heat exchange medium, and accuracy of temperature control of the storage member 60 can be improved.

As described above, according to the gas container 1, the gas absorbing and releasing performance of the storage member 60 can be fully extracted, and the absorbing and releasing performance can be improved.

In the gas container 1, the connector 20 and the accommodation member 50 have an uneven structure that fits together, and the connector 30 and the accommodation member 50 have an uneven structure that fits together. With such an uneven structure, the connectors 20 and 30 and the accommodation member 50 are fitted to each other, and thus the accommodation member 50 can be held in the internal space 11 of the container body 10. It is not necessary to use a dedicated support member or the like to hold the accommodation member 50 in the internal space 11. Therefore, the accommodation member 50 can be stably held without complicating the structure inside the container body 10.

The connector 20 and the accommodation member 50 are fixed by the fixing member 70 in a state of being fitted to each other. Specifically, the connector 20 and the accommodation member 50 are fastened to each other while the fixing member 70 is inserted through the communication passage 21 of the connector body 26 by screwing the male screw of the fixing member 70 and the female screw of the hole portion 54 of the coupling unit 53 of the accommodation member 50. In such structure, the connector 20 and the accommodation member 50 are fixed using the fixing member 70, and thus the accommodation member 50 can be prevented from coming off the connector 20.

In the gas container 1, a sealing member 80 for sealing the internal space 11 is provided between the fixing member 70 and the connector body 26 of the connector 20. Therefore, even in a configuration in which the connector 20 and the accommodation member 50 are fastened to each other by screwing the fixing member 70 with the accommodation member 50 while being inserted through the communication passage 21 of the connector body 26, gas in the internal space 11 of the container body 10 can be prevented from leaking to the outside through the gap between the fixing member 70 and the mouthpiece body 26, and the internal space 11 can be kept airtight.

Incidentally, in the above-described embodiment, the connector 20 has the wall body 28 that partitions the groove portion 26*c* into the inlet 22 side and the outlet 23 side, and the wall body 28 is configured separately from the connector body 26 and the lid body 27. However, the present disclosure is not limited thereto, and the wall body that partitions the groove portion 26*c* into the inlet 22 side and the outlet 23 side may not separate from the connector body 26 and the lid body 27, and may be formed integrally with the connector body 26 or the lid body 27.

In the above modification, heat exchange through the division portion 28*a* is less likely to occur between the relatively cold heat exchange medium that flows from the inlet 22 to the passage portion 24 and the relatively warm heat exchange medium that flows from the passage portion 24 to the outlet 23. Therefore, it is more preferable that the wall body is formed integrally with the lid body 27 made of resin than the connector body 26 made of metal. The wall body that partitions the groove portion 26*c* into the inlet 22 side and the outlet 23 side is preferably a member made of resin, but may be made of metal instead of resin, and may be formed integrally with the connector body 26.

In the above-described embodiment, the heat exchange medium is assumed to flow through the connector 20 on the side opposite to the connector 30 through which gas enters and exits. However, the present disclosure is not limited thereto, and the heat exchange medium may flow through the connector 30 through which gas enters and exits.

In the above-described embodiment, out of the connectors 20 and 30, the connector through which the heat exchange medium flows is limited to the connector 20. However, the present disclosure is not limited thereto, and the heat exchange medium may flow through both the connectors 20 and 30.

In the above embodiment, the inlet 22 and the outlet 23 of the connector 20 are formed in the lid body 27. However, the present disclosure is not limited thereto, and the inlet 22 and the outlet 23 of the connector 20 may be formed in the connector body 26, or may be formed between the connector body 26 and the lid body 27.

In the above embodiment, the connector body 26 of the connector 20 has the fitting groove 26*d*, and the coupling unit 53 of the accommodation member 50 has the fitting projection portion 53*a* that fits into the fitting groove 26*d*. However, the present disclosure is not limited thereto. Conversely, the connector body 26 of the connector 20 may have a fitting projection portion, and the coupling unit 53 of the accommodation member 50 may have a fitting groove into which the fitting projection portion thereof is fitted.

The present disclosure is not limited to the above-described embodiments and the like, and various modifications can be made without departing from the scope of the present disclosure.

What is claimed is:

1. A gas container comprising:

a tubular container body having an internal space for storing gas;

a connector attached to an end portion of the container body in a shaft direction and having a communication passage for allowing the internal space to communicate with an outside of the container body; and a storage member disposed in the internal space to absorb and release gas, wherein:

the storage member has one of a recess portion and a projection portion which are provided on a radial outer surface thereof and engage with each other; and the container body has the other of the recess portion and the projection portion which are provided on a radial inner surface thereof.

2. The gas container according to claim 1, wherein:

the container body is more easily deformed than the storage member due to changes in temperature or internal pressure of the internal space; and the recess portion and the projection portion are formed such that the recess portion and the projection portion are continuously engaged with each other when each of the container body and the storage member is deformed.

3. The gas container according to claim 1, wherein the recess portion and the projection portion are formed such that movement of the storage member in the shaft direction with respect to the container body is restricted and rotation around a shaft is restricted.

4. The gas container according to claim 1, wherein:

the container body has a tubular straight portion formed at a center in the shaft direction, and dome portions formed in a shape of dome at both end portions in the shaft direction; and the storage member is formed along inner surfaces of the straight portion and the dome portions.

5. The gas container according to claim 1, wherein the storage member is assembled to the container body by insert molding.

* * * * *